J. O. A. BENNETT.
Barrel-Truck.

No. 8,092. Reissued Feb. 19, 1878.

WITNESSES.

Geo. R. Fludder

A. C. Eader

INVENTOR.

James O. A. Bennett

By Chas. B. Mann

Attorney

N. PETERS, PHOTO-LITHOGRAPHER, WASHINGTON, D. C.

UNITED STATES PATENT OFFICE.

JAMES O. A. BENNETT, OF MORRISON, ILLINOIS.

IMPROVEMENT IN BARREL-TRUCKS.

Specification forming part of Letters Patent No. 189,015, dated April 3, 1877; Reissue No. 8,092, dated February 19, 1878; application filed December 4, 1877.

*To all whom it may concern:*

Be it known that I, JAMES O. A. BENNETT, of Morrison, in the county of Whitesides and State of Illinois, have invented a new and useful Improvement in Barrel Attachments, which is fully set forth in the following specification and accompanying drawing, in which—

Figure 1:
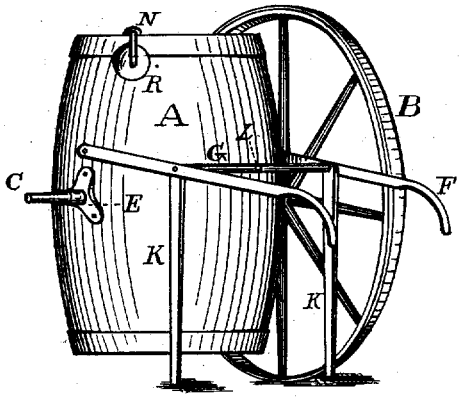
Figure 2:
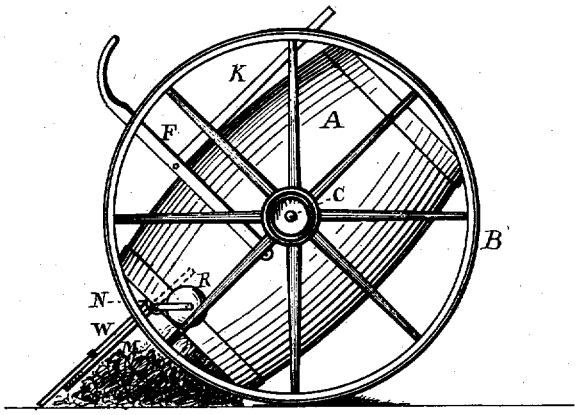
Figure 3:
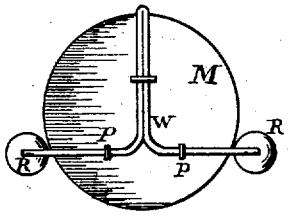

Figure 1 is a perspective view of a barrel with my improvements complete. Fig. 2 is a side view of same, showing the manner of emptying the barrel. Fig. 3 is a view of the barrel-cover.

My invention relates to a wheel barrel-cart, consisting of an ordinarily-shaped barrel, of suitable strength, to the sides of which are bolted or otherwise secured plates, to which are attached spindles or arms, which serve as the axis for wheels, and provided with handles and legs, the former rendering its propulsion and tipping convenient, and the latter sustaining the barrel in an upright position for facility of filling; and, also, in providing a weight-balanced cover for the barrel, as hereinafter described, and pointed out in the claims.

Referring to the drawing, A represents the barrel; B, the wheels; C, the arm or spindles, with a plate, E, attached, by which the spindle is bolted or otherwise secured to the sides of the barrel, thus serving as the axis on which the wheels revolve.

The handles F are attached on each side of the barrel in any suitable manner, and are connected by means of the cross-bar G, which is firmly bolted at L to the barrel. The legs K are attached to the handles by a screw or bolt, and may be secured either rigidly or so as to swing, as preferred.

The handles, legs, cross-bar, spindles, and wheels comprise the attachments, which, when applied to a barrel, constitute a convenient barrel-cart, which may be put to numerous uses.

M represents the barrel-cover, having the rods W attached by the staples P, and held or pivoted to the barrel by the staples N, beyond which point the rods are bent downward, and have the balls R attached, which balance the cover when open. The location of the staples N is at one side of the center of the barrel-top, so as to give a larger opening when the cover is balanced open.

My barrel-cart is operated as follows: While being filled it rests in the position shown in Fig. 1, the cover, however, being raised. When filled it may be wheeled, in the same manner as a wheelbarrow or truck, to the place where it is to be emptied, when the contents may be turned out by raising the handles, which tips the barrel forward. The balls R drop down, their weight throwing the cover open, as shown in Fig. 2.

Having described my invention, I claim and desire to secure by Letters Patent—

1. A wheel barrel-cart consisting of an ordinarily-shaped barrel, to the sides of which are bolted plates E, having attached the spindle or arm C, as shown, and provided with handles attached directly to the barrel, and legs so attached as to sustain the barrel upright, as specified.

2. A truck or cart consisting of a barrel mounted by the spindles C, attached by the plate E to the sides, and the handles F, attached as shown, and connected by the cross-bar G, which is bolted to the barrel, and the legs K, attached to the handles by a screw or bolt, as herein shown and described.

3. The barrel-cover M, pivot-rods W, and balls or weights R, arranged and operating substantially as shown and described.

4. The improved barrel-cart, consisting of the barrel A, with spindles C, secured by the plate or lug E, wheels B, and handles F, and the weight-balanced cover, substantially as shown and described, and for the purpose set forth.

JAMES O. A. BENNETT.

Witnesses:
FRANK D. RAMSAY,
LAFAYETTE T. STOCKING.